(12) United States Patent
Brockhouse

(10) Patent No.: US 10,993,427 B2
(45) Date of Patent: May 4, 2021

(54) SNAG RELEASE FISHING LURE APPARATUS

(71) Applicant: Michael Griffith Brockhouse, Wesley Chapel, FL (US)

(72) Inventor: Michael Griffith Brockhouse, Wesley Chapel, FL (US)

(*) Notice: Subject to any disclaimer, the term of this patent is extended or adjusted under 35 U.S.C. 154(b) by 171 days.

(21) Appl. No.: 16/418,847

(22) Filed: May 21, 2019

(65) Prior Publication Data
US 2019/0357513 A1 Nov. 28, 2019

Related U.S. Application Data

(60) Provisional application No. 62/675,078, filed on May 22, 2018.

(51) Int. Cl.
| A01K 91/04 | (2006.01) |
| A01K 91/06 | (2006.01) |
| A01K 97/24 | (2006.01) |
| A01K 85/18 | (2006.01) |

(52) U.S. Cl.
CPC .............. *A01K 91/04* (2013.01); *A01K 85/18* (2013.01); *A01K 91/06* (2013.01); *A01K 97/24* (2013.01)

(58) Field of Classification Search
CPC ................................ A01K 91/06; A01K 97/24
USPC ......................................................... 43/43.4
See application file for complete search history.

(56) References Cited

U.S. PATENT DOCUMENTS

| 2,332,400 A | * | 10/1943 | Richardson | A01K 85/02 43/42.1 |
| 2,537,321 A | * | 1/1951 | Walton | A01K 91/06 43/43.1 |
| 2,586,073 A | * | 2/1952 | McKee | A01K 97/24 43/17.2 |
| 2,600,314 A | * | 6/1952 | Miner | A01K 83/06 43/41 |
| 2,779,120 A | * | 1/1957 | Moore | A01K 97/24 43/17.2 |
| 3,170,756 A | * | 2/1965 | Butler | A01K 83/00 43/43.4 |
| 3,722,128 A | * | 3/1973 | Tremblay | A01K 83/00 43/42.1 |
| 3,765,117 A | * | 10/1973 | Gibson, Sr. | A01K 83/00 43/42.1 |
| 3,849,928 A | * | 11/1974 | Collins, Sr. | A01K 85/02 43/37 |
| 4,020,583 A | * | 5/1977 | Gatlyn | A01K 85/02 43/42.41 |
| 4,043,072 A | * | 8/1977 | Condurso | A01K 97/24 43/17.2 |
| 4,536,984 A | * | 8/1985 | Kowal | A01K 97/24 43/17.2 |

(Continued)

FOREIGN PATENT DOCUMENTS

| DE | 4114851 A1 * | 11/1992 | ............. A01K 91/06 |
| WO | WO-0060934 A1 * | 10/2000 | ............. A01K 85/16 |

*Primary Examiner* — Christopher P Ellis

(57) ABSTRACT

The present invention relates generally to fishing equipment, more specifically but not by way of limitation, a fishing lure apparatus that includes a first portion and a second portion wherein the fishing lure apparatus is configured to provide a first position and a second position for a fishing line secured thereto in order to facilitate release of the fishing lure apparatus on which it is snagged.

6 Claims, 3 Drawing Sheets

(56) References Cited

U.S. PATENT DOCUMENTS

| | | | | |
|---|---|---|---|---|
| 4,649,662 A * | 3/1987 | Tharp | ............... | A01K 95/00 43/43.14 |
| 4,712,324 A * | 12/1987 | Padgett | ............ | A01K 97/24 43/17.2 |
| 4,885,863 A * | 12/1989 | Sprague | ............ | A01K 97/24 43/17.2 |
| 6,502,345 B1 * | 1/2003 | Doyle | ............... | A01K 97/24 43/17.2 |
| 7,246,462 B1 * | 7/2007 | Bocharov | ............ | A01K 97/24 43/17.2 |
| 7,832,139 B1 * | 11/2010 | Christensen | ............ | A01K 91/06 43/44.87 |
| 2006/0137239 A1 * | 6/2006 | Link | ............... | A01K 95/00 43/44.97 |
| 2006/0156612 A1 * | 7/2006 | Brzozowski | ............ | A01K 91/14 43/43.15 |
| 2009/0090038 A1 * | 4/2009 | Meredith | ............ | A01K 97/24 43/17.2 |
| 2018/0213762 A1 * | 8/2018 | Peters | ............... | A01K 97/24 |

* cited by examiner

SNAG RELEASE FISHING LURE APPARATUS

BACKGROUND OF INVENTION

As is known in the art, there are numerous types of fishing techniques that are employed commercially and recreationally. For the recreational fishermen or fisherwomen targeting game fish the most common equipment utilized is a rod and reel. Rod and reels are available in numerous configurations and are typically designed for a specific application such as but not limited to bass fishing or inshore fishing. Regardless of the type of fishing being engaged in, most fishermen and fisherwomen utilize two categories of bait, artificial or natural bait. These baits are available in a vast array of styles and types. These baits can be attached to a hook to create a fishing lure.

It is well-known that game fish live in and near natural and man-made structures such as but not limited to vegetation, rocks, docks, vessels, and seawalls. The fish use these structures for protection from natural elements and as areas in which to ambush prey. To target these fish, it is desirable for a fisherman or fisherwoman to cast their fishing lure into and near these structures. As is known in the art, utilization of fishing lures in areas that have these structures present challenges. As a fishing lure is retrieved subsequent casting thereof it is very common for the fishing lure to get snagged on the aforementioned structure types. Once a fishing lure is snagged, retrieving the fishing lure can be difficult and many times will result in the damaging or breaking of the fishing line and loss or damage of the fishing lure. No existing fishing lure provide a technique to change the fishing line position in order to alter the leverage and potentially free the fishing lure from the structure on which it is snagged.

Accordingly, there is a need for a fishing lure apparatus that is configured to provide a first line position and a second line position so as to provide a leverage change in order to potentially free the fishing lure apparatus from a structure on which it is snagged.

BRIEF SUMMARY OF THE INVENTION

It is the object of the present invention to provide a fishing lure apparatus that is configured to assist in the release from a structure on which it is snagged and/or prevention of a snag wherein the fishing lure apparatus includes a first portion and a second portion.

Another object of the present invention is to provide a fishing lure apparatus configured to facilitate the release thereof from a structure wherein the first portion includes a hook and a bait wherein the bait is at least partially engaged with the hook so as to cover a portion thereof.

A further object of the present invention is to provide a fishing lure apparatus that is configured to assist in the release from a structure on which it is snagged and/or prevention of a snag wherein the fishing line is secured to the eye of the hook.

Still another object of the present invention is to provide a fishing lure apparatus configured to facilitate the release thereof from a structure wherein in the scope of the present invention it is contemplated that the second portion have a plurality of alternative embodiments in regards to parameters such as but not limited to size, weight, color, buoyancy and material.

An additional object of the present invention is to provide a fishing lure apparatus that is configured to assist in the release from a structure on which it is snagged and/or prevention of a snag wherein the second portion is slidably secured to the fishing line and is forward of the first portion so as to be more proximate a rod and reel to which the fishing line may be attached.

Yet a further object of the present invention is to provide a fishing lure apparatus configured to facilitate the release thereof from a structure wherein the second portion of the fishing lure apparatus includes a first end and a second end.

Another object of the present invention is to provide a fishing lure apparatus that is configured to assist in the release from a structure on which it is snagged and/or prevention of a snag wherein the second portion further includes a channel that is journaled through the body of the second portion intermediate the first end and second end and wherein the channel has openings at each end thereof.

An alternate object of the present invention is to provide a fishing lure apparatus configured to facilitate the release thereof from a structure wherein the body of the second portion includes a front surface that is shaped so as to inhibit snagging thereof.

Still a further object of the present invention is to provide a fishing lure apparatus that is configured to assist in the release from a structure on which it is snagged and/or prevention of a snag wherein the second portion is manufactured from a buoyant material.

An additional object of the present invention is to provide a fishing lure apparatus configured to facilitate the release thereof from a structure wherein the second portion can be weighted and wherein the weight can be permanent or releasably secured therein.

A further object of the present invention is to provide a fishing lure apparatus that is configured to assist in the release from a structure on which it is snagged and/or prevention of a snag wherein the second portion further includes a second channel with the second channel being perpendicular to the first channel so as to form a groove proximate the front of the body of the second portion.

An alternative objective of the present invention is to provide a fishing lure apparatus configured to facilitate the release thereof from a structure wherein it is further contemplated that additional channels could be formed in the body of the second portion in order to provide alternate positions for the fishing line engaged therewith.

Another object of the present invention is to provide a fishing lure apparatus that is configured to assist in the release from a structure on which it is snagged and/or prevention of a snag wherein it is contemplated within the scope of the present invention that the body of the second portion could be formed in alternate shapes and sizes.

Yet a further object of the present invention is to provide a fishing lure apparatus configured to facilitate the release thereof from a structure wherein the second portion of the fishing lure apparatus could have a line attachment incorporated as a part thereof.

Another object of the present invention is to provide a fishing lure apparatus that is configured to assist in the release from a structure on which it is snagged and/or prevention of a snag wherein the channel formed in the body of the second portion provides protection to the fishing line.

An additional object of the present invention is to provide a fishing lure apparatus configured to facilitate the release thereof from a structure wherein it is contemplated within the scope of the present invention that the second portion could retention element such as but not limited to a spring or mechanical fastener so as to facilitate the positioning of the fishing lure apparatus.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

DETAILED DESCRIPTION OF THE INVENTION

Figure 1:
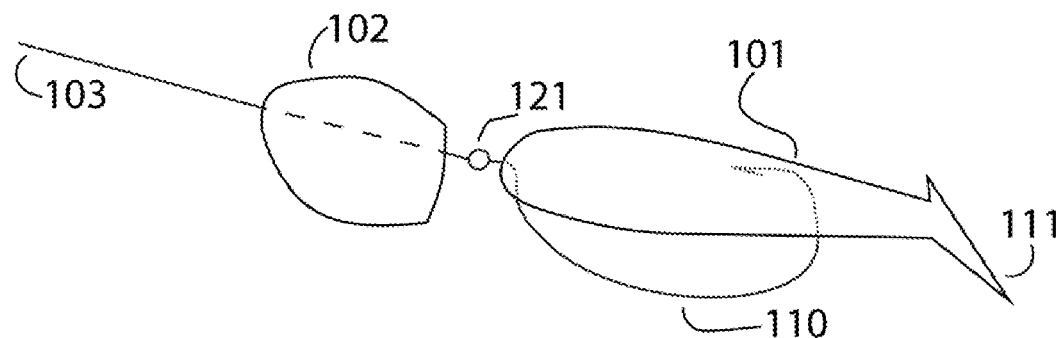
FIG. 1 is a side view of the first portion and second portion of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding description is, therefore, not intended to be limited to the specific forms set forth herein, but on the contrary, it is intended to cover such alternatives, modifications, and equivalents, as can be reasonably included within the spirit and scope of the invention.

FIG. 1 shows an embodiment of the fishing lure apparatus containing both the first portion (101) comprised of a hook (110) and a bait (111) and the second portion (102) consisting of the snag release invention secured to the fishing line (103). The dashed portion of the fishing line (103) is used to indicate the line is passing inside the second portion (102). The fishing line is tied to the eye of the hook (121).

Figure 2:
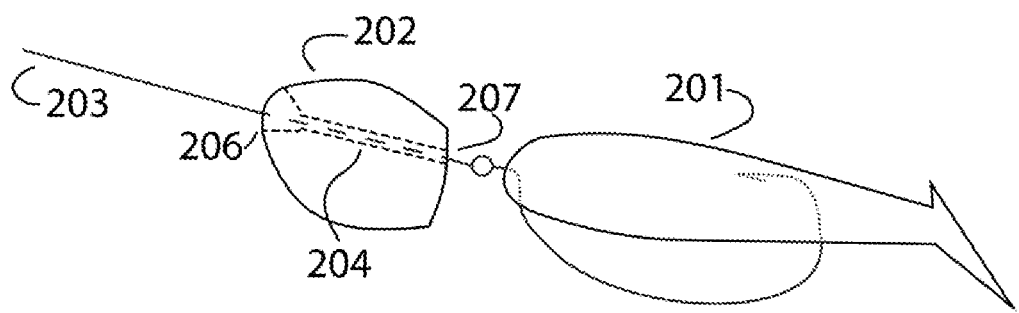
FIG. 2 is a side view showing the line channel through the second portion of the present invention.

FIG. 2 illustrates how the second portion (202) is slidably secured to the fishing line (203). The fishing line (203) passes from the rod and reel to the first end (206) of the line channel (204) and through to the second end (207) of the line channel (204) of the second portion (202) to the first portion (201) of the fishing lure apparatus. The dashed lines of the line channel (204) are shown below and above the more sparsely dashed lined of the fishing line (203) to illustrate that the fishing line passes through the line channel and both the line channel and fishing line are inside the snag release invention.

Figure 3:
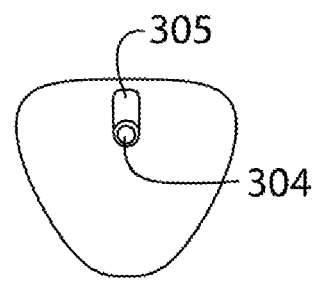
FIG. 3 is a front view of the present invention showing a particular embodiment and the external view of the groove at the first end of the line channel.

FIG. 3 shows the front view of the invention in a particular embodiment showing the first end includes a second channel (305) with the second channel being perpendicular to the first channel (304) so as to form a groove proximate the front of the body of the second position. This groove provides the recess in which the fishing line may freely travel. The free movement of the fishing line within the groove allows the invention to more easily release from snags and protect the fishing line. This figure also shows a triangular embodiment of the front view where the wider upper section will sit in the water above the narrower lower portion.

Figure 4:
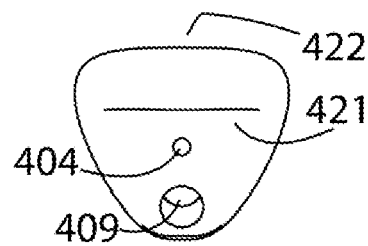
FIG. 4 is a rear view of the present invention showing a particular embodiment and the external view of the second end of the line channel and a chamber or region to which weight can be added to improve performance.

FIG. 4 shows the rear view of the invention in a particular embodiment showing the relationship between the line channel (404) and the second end of the snag release device. The figure also shows a chamber (409) in which a weight for ballast can be inserted. In another embodiment, the chamber could be eliminated and the weight or ballast could be incorporated within the same lower region internally or as a denser composition of material than the upper region of the device. Regardless of the method, the added weight will improve the function of the snag release invention and improve the casting distance and casting accuracy of the fishing lure apparatus. The horizontal line (421) represents the top edge of the rear end of the invention which slopes up to the center portion (422) of the invention.

Figure 5:
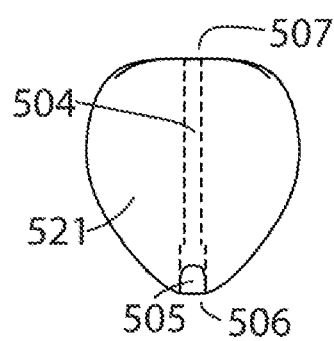
FIG. 5 is a top view of the present invention showing a particular embodiment and the external view of the groove and the internal view of the line channel as it runs from the first end to the second end.

FIG. 5 shows a top view of the invention in a particular embodiment so as to illustrate the groove (505) extends the recess in which the fishing line may travel and lay to the top side (521) of the device. This allows the line to reside protected even when it is extended forward from the top side (521) of the snag release device at an angle perpendicular or greater to the line channel (504). It also shows the line channel (504) extending from the first end (506) opening to the second end (507) opening. The dashed lines show the portion of the line channel that is inside the invention.

Figure 6:
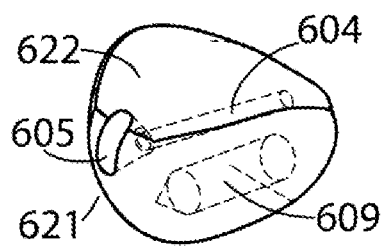
FIG. 6 is a perspective view of the present invention in a particular embodiment showing the external view of the groove and internal view of the line channel as it runs from the first end to the second end and the internal view of the weight chamber or region.

FIG. 6 shows a perspective view of the invention in a particular embodiment showing the external view of the groove (605) and the internal view of the line channel (604) and the weighted ballast chamber or region (609). From the illustration, it can be seen that the groove (605) creates a linear recess in both the front (621) and top (622) portions of the device so that the fishing line can move freely in a plurality of angles within the recess as it passes from the line channel (604) to the rod and reel. The figure also shows a preferred outer and inner shape of recess made by the groove and first end of the line channel. The weighted ballast chamber or region (609) is shown below the line channel (604) in the lower portion of the device. Dashed lines indicate the element is inside the body of the device.

Figure 7:
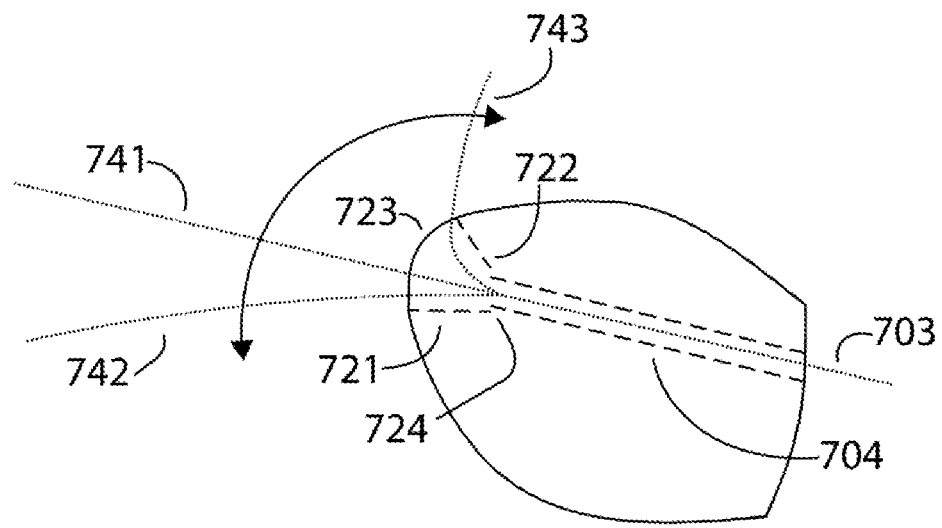
FIG. 7 is a side view of the present invention in an embodiment showing the ability of the line to move freely inside the groove at the first end of the line channel.

FIG. 7 shows the side view of the present invention in a particular embodiment showing the ability of the fishing line (703) to move freely inside the preferred inner shape of recess made by the groove and first end of the line channel. The side view of the preferred inner shape of the recess is illustrated by a bottom region (721), a back region (722), the front opening region (723) made by the groove, and the rear channel region (724) made by the first line channel (704). The fishing line is shown in only three positions of a plurality of positions to the angle of the line (703) inside the line channel (704) for illustration purposes only and in no way a limitation on possible line positions. These line positions consist of a first position (741), a lower second position (742), and a higher second position (743). The fishing line is shown as dotted lines to differentiate it from the device and the internal surfaces of the device which are shown as dashed lines.

Figure 8:
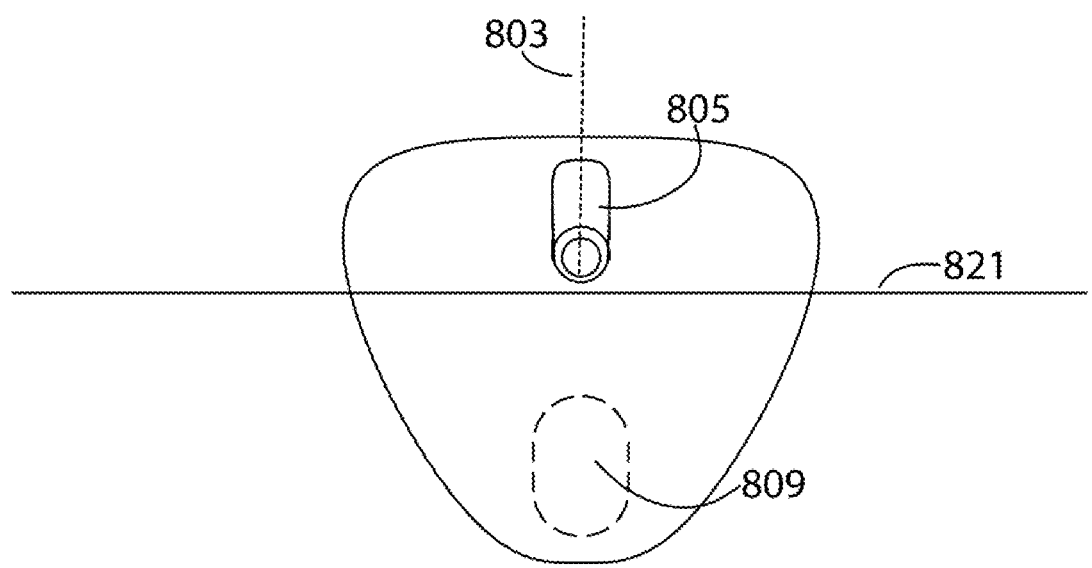
FIG. 8 is a front view of the present invention in a particular embodiment showing how a weighted ballast cavity or region properly aligns the groove at the first end of the line channel for optimal effectiveness.
Figure 9:
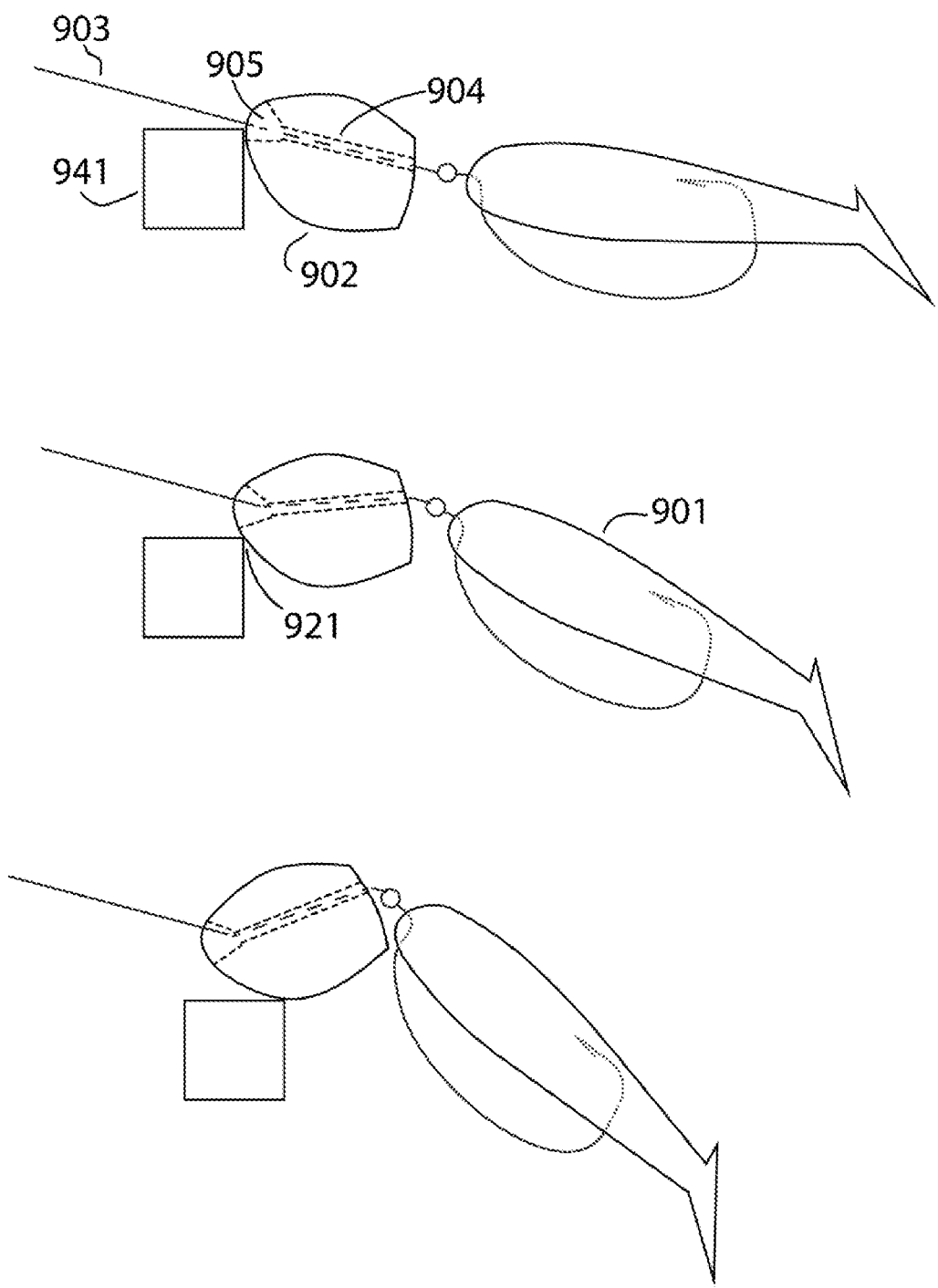
FIG. 9 is a side view of the present invention in a particular embodiment showing the ability of the second portion to pivot and protect the fishing line as it is retrieved over structure.

FIG. 8 illustrates a front view of the invention in a particular embodiment showing the weighted ballast chamber or region (809) being utilized to properly align the groove (805) perpendicularly to the water line (821). This position allows the fishing line (803) to move freely within the groove as it relates to the angle of the line to the rod and reel. This position also, as illustrated in FIG. 9, allows the invention to properly rotate or pivot when it contacts a structure. The position of the water line is for illustration purposes only and could be drawn higher of lower than shown. The fishing line is shown as a dotted line to differentiate it from the device. The weighted ballast region is shown as a dashed line section to show that it is inside the device. Alternatives to the weighted ballast region can be but are not limited to a cavity or chamber in which to add weight or a denser composition of material than the rest of the device.

FIG. 9 shows the ability of the snag release device to rotate or pivot when it contacts a structure. It also shows how the device uses a particular embodiment of the groove and its front surface shape so as to use its surface to protect and move the fishing line away from surfaces of structures that can damage or break the line. The groove and its internal shape (905) as shown in FIG. 7 allows the snag release device to alter the line position as it relates to the line channel (904) resulting in a rotation or pivoting of the device when it contacts a structure. The three images incorporated in FIG. 9 show the sequential movement of the snag release device when it contacts a structure. The top image shows the snag release device (902) first contacting a structure (941) as it is retrieved toward the rod and reel. Here the outer rim of front opening of the groove (905) has engaged the structure so that the fishing line (903) remains free to move within the groove. The middle image shows the snag release device at a future second position as it continues to be retrieved by rod and reel. Due to the high friction surface of the structure, the snag release device has begun to pivot allowing its front surface shape (921) to more easily slide up the structure at a lower angle of attack so as to reduce frictional forces applied by the structure and allow it to progress forward in the direction of the rod and reel. Also, the first portion (901) of the lure apparatus can move independently of the snag release device so as to allow the snag release device to pivot as designed. The bottom image shows the snag release device at a future third position as it continues to be retrieved by the rod and reel. Here the device has reached the top of the structure where it will easily release from the structure and allow the entire fishing lure apparatus to progress forward free of snag and damaged line back to the rod and reel and ready for the next cast.

The present invention in one embodiment is made of a resin mixed with additives called micro-balloons that allow for the buoyancy of the final body of the snag release device to be modified. The resin mixture is cast in a silicone mold to achieve the desired outward appearance. The ballast can be added to the body in many ways but not limited to steel or tungsten items being added directly to the resin as it sets or inserted into a molded cavity after the resin has set. The amount of weight to be added is determined by the resin to micro-balloons ratio and the desired components to be incorporated into the first portion of the fishing lure apparatus. Regardless, the weight or higher density region should be near the bottom of the device to serve as ballast.

There are multiple products currently available or previously available for transforming the appearance, buoyancy, action, and presentation of artificial and natural baits so that they may be fished as topwater or suspending lures. These include, but are not limited to: a foam headed snake lure by a well-known fisherman Doug Hannon that used a small, snake-like, soft-foam head attached to a custom hook and custom soft-plastic body; the Betts Carolina Floater; and Baitscape's Corona Universal Floating Head. Though each of these products offers buoyancy, action, and other changes to fishing lures such as soft-plastics, none of these offer a fishing lure apparatus that is configured to provide a first line position and a second line position so as to provide a leverage change in order to potentially free the fishing lure apparatus from a structure on which it is snagged and minimize damage or breakage of fishing line when the fishing lure apparatus encounters structures or is freed from a snag.

The invention claimed is:

1. A fishing lure apparatus comprising a first portion and a second portion;
    said first portion comprises a hook and an artificial or natural bait; said hook being tied to a fishing line and the bait is at least partially engaged with the hook;
    said second portion comprises a snag release device that is slidably secured to the fishing line forward the first portion by a line channel;
    said line channel comprising a groove having a first linear recess and a second linear recess; the groove being configured to provide a first line position and a second line position so as to provide a leverage change in order to free the fishing lure apparatus from a structure on which it is snagged during retrieval of said fishing lure.

2. The apparatus of claim 1, wherein the line channel allows the fishing line to move in a plurality of angles.

3. The apparatus of claim 1, wherein the snag release device protects the fishing line from damage by allowing the line to position freely and reside within the recesses so as to allow the line to avoid contact with structures by having an outer rim of the groove and front end of the device contact structures where the device can pivot to initially move the line away from the structures and then progressively increase the distance between the line and the structure surfaces.

4. The apparatus of claim 1, wherein the snag release device incorporates a ballast system comprised of a denser material within the lower region.

5. The apparatus of claim 1, wherein the snag release device may vary in size, weight, color, buoyancy and material.

6. The apparatus of claim 1, wherein the body of the snag release device includes a front surface that is shaped so as to inhibit snagging thereof.

* * * * *